US011346419B2

United States Patent
Liebert et al.

(10) Patent No.: US 11,346,419 B2
(45) Date of Patent: May 31, 2022

(54) CLUTCH ASSEMBLY FOR A MOTOR VEHICLE DRIVETRAIN, AND MOTOR VEHICLE DRIVETRAIN

(71) Applicant: Bayerische Motoren Werke Aktiengesellschaft, Munich (DE)

(72) Inventors: Sebastian Liebert, Unterfoehring (DE); Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/282,166

(22) PCT Filed: Oct. 2, 2019

(86) PCT No.: PCT/EP2019/076669
§ 371 (c)(1),
(2) Date: Apr. 1, 2021

(87) PCT Pub. No.: WO2020/088873
PCT Pub. Date: May 7, 2020

(65) Prior Publication Data
US 2022/0010855 A1     Jan. 13, 2022

(30) Foreign Application Priority Data
Oct. 31, 2018   (DE) .................. 10 2018 127 155.7

(51) Int. Cl.
*F16H 45/02* (2006.01)
*F16D 67/06* (2006.01)
(Continued)

(52) U.S. Cl.
CPC .............. *F16D 67/06* (2013.01); *B60K 17/02* (2013.01); *B60T 1/005* (2013.01); *F16D 11/10* (2013.01);
(Continued)

(58) Field of Classification Search
CPC ........... F16H 63/32; F16H 2057/02043; F16H 2057/02034; F16H 63/502;
(Continued)

(56) References Cited

U.S. PATENT DOCUMENTS 3,512,618 A * 5/1970 Schafer .................. F16D 55/00
188/161
5,119,918 A * 6/1992 Pardee .................... F16D 67/06
192/18 B
(Continued)

FOREIGN PATENT DOCUMENTS

DE              103 24 487 A1    12/2004
DE     10 2006 004 125 A1       8/2007
(Continued)

OTHER PUBLICATIONS

International Search Report (PCT/ISA/210) issued in PCT Application No. PCT/EP2019/076669 dated Jan. 31, 2020 with English translation (five (5) pages).
(Continued)

*Primary Examiner* — Charles A Fox
*Assistant Examiner* — Farhana Pervin
(74) *Attorney, Agent, or Firm* — Crowell & Moring LLP

(57) ABSTRACT

A clutch assembly for a motor vehicle drivetrain for coupling coupling elements for conjoint rotation includes a clutch unit, a brake unit and at least one permanent magnet between the clutch unit and the brake unit. The clutch unit is shiftable into a coupling state in which the coupling elements are coupled to one another by shifting the clutch unit from a first position in which the coupling elements are decoupled into a second position in which the coupling elements are coupled. First and second electrically energizable coils are electrically energizable to move the permanent magnet from the first position into the second position (Continued)

or vice versa. A holding plate is located adjacent to the at least one permanent magnet to suppress magnetic flux from the at least one permanent magnet to the brake unit. A motor vehicle drivetrain containing at least one clutch assembly is also provided.

21 Claims, 5 Drawing Sheets

(51) Int. Cl.
| | |
|---|---|
| *B60K 17/02* | (2006.01) |
| *B60T 1/00* | (2006.01) |
| *F16D 11/10* | (2006.01) |
| *F16D 27/00* | (2006.01) |
| *F16D 27/108* | (2006.01) |
| *F16D 63/00* | (2006.01) |
| *F16D 65/16* | (2006.01) |
| *F16D 121/20* | (2012.01) |

(52) U.S. Cl.
CPC ......... *F16D 27/004* (2013.01); *F16D 27/108* (2013.01); *F16D 63/002* (2013.01); *F16D 63/006* (2013.01); *F16D 65/16* (2013.01); *F16D 2121/20* (2013.01); *F16D 2500/1022* (2013.01); *F16D 2500/10412* (2013.01); *F16D 2500/1107* (2013.01)

(58) Field of Classification Search
CPC ..... F16H 2061/0422; F16H 2061/0474; F16H 2003/0811; F16H 3/089; F16H 2200/0021; F16H 2200/0034; F16H 61/32; F16H 61/0204; B60K 2001/001; B60W 2510/1015; B60W 2710/086; B60W 2710/081; B60W 2710/083; B60W 2710/021; B60W 2710/022; B60W 2710/1005

USPC .................................................. 74/330, 331
See application file for complete search history.

(56) References Cited

U.S. PATENT DOCUMENTS

| | | | |
|---|---|---|---|
| 2004/0099500 A1 | 5/2004 | Stevenson et al. | |
| 2004/0144609 A1* | 7/2004 | Schneider | ............... F16D 67/06 |
| | | | 192/14 |
| 2006/0278480 A1* | 12/2006 | Pardee | ................. F16D 27/112 |
| | | | 188/218 XL |
| 2012/0152687 A1* | 6/2012 | Kimes | ................... F16D 41/125 |
| | | | 192/84.2 |
| 2018/0017121 A1* | 1/2018 | Lahr | ........................ F16D 27/10 |
| 2018/0022201 A1* | 1/2018 | Samila | .................. F16D 27/118 |
| | | | 192/46 |
| 2018/0058518 A1* | 3/2018 | Uppal | ................... F16D 27/102 |
| 2018/0347642 A1* | 12/2018 | Kimes | ................... F16D 27/108 |

FOREIGN PATENT DOCUMENTS

| | | |
|---|---|---|
| DE | 10 2007 058 552 A1 | 6/2009 |
| DE | 20 2016 107 420 U1 | 3/2017 |
| EP | 2 133 585 A1 | 12/2009 |
| WO | WO 2018/145061 A1 | 8/2018 |

OTHER PUBLICATIONS

German-language Written Opinion (PCT/ISA/237) issued in PCT Application No. PCT/EP2019/076669 dated Jan. 31, 2020 (five (5) pages).

German-language Search Report issued in German Application No. 10 2018 127 155.7 dated Oct. 14, 2019 with partial English translation (12 pages).

\* cited by examiner

CLUTCH ASSEMBLY FOR A MOTOR VEHICLE DRIVETRAIN, AND MOTOR VEHICLE DRIVETRAIN

BACKGROUND AND SUMMARY OF THE INVENTION

The invention relates to a clutch assembly for a motor vehicle drivetrain.

Clutch assemblies are known in the case of which, for the rotationally conjoint coupling of two coupling elements, a clutch unit is transferred into a coupling state by virtue of a permanent magnet being moved from a first position into a second position. For the movement of the permanent magnet, two electrically energizable coils are provided which, for the purposes of moving the permanent magnet from the first position into the second position or vice versa, are correspondingly electrically energizable such that the coil through which electrical current is respectively flowing attracts the permanent magnet. Operatively connected to the permanent magnet is an actuating mechanism which effects the coupling state in the event of a movement of the permanent magnet into the first position.

A disadvantage here is that a magnetic flux is generated by the permanent magnet in the surrounding components. This gives rise to reluctance forces which pull components which are rotating relative to one another axially into contact, as a result of which disruptive frictional moments and drag losses are generated.

It is therefore an object of the invention to provide an improved clutch assembly which is designed such that an influence of reluctance forces during the operation of the clutch assembly is minimized.

This object is firstly achieved according to the invention by means of a clutch assembly for a motor vehicle drivetrain for rotationally conjointly coupling two coupling elements, having a clutch unit and a brake unit, wherein at least one permanent magnet is provided which is arranged between the clutch unit and the brake unit and which, for the purposes of transferring the clutch unit into a coupling state in which the coupling elements are rotationally conjointly coupled to one another, is movable from a first position, in which the coupling elements are decoupled, into a second position, in which the coupling elements are coupled. Furthermore, a first and a second electrically energizable coil are provided which are correspondingly electrically energizable for the purposes of moving the permanent magnet from the first position into the second position or vice versa. According to the invention, a holding plate assigned to the brake unit is composed at least partially of a ferromagnetic material and at least partially of a non-ferromagnetic material, such that a magnetic flux generated by the permanent magnet in the surrounding components is interrupted.

In this way, the advantage is achieved that the generation of disruptive reluctance forces is reduced or prevented. It is thus the case that less undesired frictional moments and drag moments are generated between components which are rotating relative to one another.

Through the use of both ferromagnetic material and non-ferromagnetic material, the holding plate can be optimally configured with regard to material loading and magnetic characteristics. In particular in the region of particularly high material loading, it is advantageous to provide a ferromagnetic material.

The object of the invention is furthermore achieved by means of a clutch assembly for a motor vehicle drivetrain for rotationally conjointly coupling two coupling elements, having a clutch unit and a brake unit, wherein at least one permanent magnet is provided which is arranged between the clutch unit and the brake unit and which, for the purposes of transferring the clutch unit into a coupling state in which the coupling elements are rotationally conjointly coupled to one another, is movable from a first position, in which the coupling elements are decoupled, into a second position, in which the coupling elements are coupled. Furthermore, a first and a second electrically energizable coil are provided which are correspondingly electrically energizable for the purposes of moving the permanent magnet from the first position into the second position or vice versa. According to the invention, a holding plate assigned to the brake unit is of step-free form at its inner side situated radially at the inside. For example, the holding plate is of rectangular cross section.

Through the avoidance of steps at that side of the holding plate which is situated radially at the inside, axial contact surfaces are avoided, such that undesired frictional moments and drag moments at least between the holding plate and a component rotating radially within the holding plate are avoided, even if reluctance forces arise. Furthermore, a holding plate without steps is easy to manufacture.

In one embodiment, the coil through which electrical current is respectively flowing can attract the permanent magnet. Alternatively, both coils may be electrically energized simultaneously, wherein a movement direction of the permanent magnet is dependent on the electrical current direction.

In one embodiment, the brake unit comprises the holding plate, which is arranged so as to be rotationally fixed relative to a housing of the clutch assembly, a brake disk, which is rotatable relative to the holding plate, and at least one pawl, wherein the pawl can, for the purposes of braking, be brought into engagement with corresponding detent geometries of the holding plate and of the brake disk, and wherein the holding plate comprises a ferromagnetic core and at least one shield plate composed of a non-ferromagnetic material. By means of the shield plate, a magnetic flux is interrupted, and the generation of reluctance forces is prevented. Frictional moments are thus prevented, in particular between the holding plate and the brake disk which rotates relative to the holding plate.

The use of a non-ferromagnetic shield plate is advantageous in particular if an axial contact surface is present between the holding plate and the brake disk.

The multi-part design of the holding plate with a ferromagnetic core and with at least one shield plate likewise has an advantageous effect on production costs. Owing to the multi-part form, it is possible, instead of sintering, turning or milling, for less expensive manufacturing methods such as for example precision stamping or other methods to be used for manufacturing the holding plate.

According to a further embodiment, the holding plate may comprise at least two shield plates which are arranged in each case laterally on the holding plate. In this way, the generation of axial reluctance forces is even more reliably prevented.

The at least one shield plate may define an axial stop for the brake disk. In this way, the position of the brake disk and an axial clearance of the brake disk relative to the holding plate can be set.

Alternatively or in addition, the holding plate may at least partially overlap the brake disk in a radial direction in order to define an axial stop for the brake disk.

If the holding plate is of step-free form at its inner side situated radially at the inside, it is possible to dispense with shield plates on the holding plate.

In order to activate the brake unit and thus brake or stop the clutch assembly, a solenoid may be provided, wherein the pawl can be brought into detent engagement with the holding plate and the brake disk by means of an activation of the solenoid. As a result of the detent engagement of the pawl, the brake disk is coupled to the holding plate such that a rotation of the brake disk is blocked.

The clutch unit preferably has a clutch disk which, similarly to the holding plate, is composed at least partially of a ferromagnetic material and at least partially of a non-ferromagnetic material, such that a magnetic flux generated by the permanent magnet in the clutch disk is interrupted. In this way, the generation of reluctance forces is also prevented in the clutch unit. Thus, the influence of a magnetic flux generated by the permanent magnet can be reliably prevented in all components surrounding the permanent magnet.

In one embodiment, the clutch disk may also be composed entirely of a non-ferromagnetic material.

It is however recommended that a ferromagnetic material be provided, in particular in regions in which the material of the clutch disk is highly loaded, because ferromagnetic material has better material characteristics with regard to strength and material fatigue etc.

In one embodiment, the clutch unit comprises a carrier element, wherein the clutch disk is arranged axially adjacent to the carrier element and engages around, or overlaps, the carrier element in an axial direction at least in certain sections. In this way, the clutch unit is of particularly compact form.

The clutch unit furthermore has at least one further pawl which can be brought into engagement with a detent geometry of the clutch disk in order to bring the clutch unit into a coupling state. By means of the pawl, the clutch disk can be easily releasably coupled to a further element, in particular to the carrier element.

In particular, the pawl assigned to the clutch unit is arranged radially between the clutch disk and the carrier element. By means of such an arrangement, the clutch disk can, in the coupling state, be reliably coupled to the carrier element.

The pawls of the clutch unit and of the brake disk are preferably likewise composed of a ferromagnetic material.

The carrier element may likewise be composed at least partially of a ferromagnetic material and at least partially of a non-ferromagnetic material. In this way, the influence of a magnetic flux generated by the permanent magnet in all components surrounding the permanent magnet can be even more reliably prevented. Alternatively, the carrier element may be composed entirely of a non-ferromagnetic material.

The object is furthermore achieved by means of a motor vehicle drivetrain having at least one clutch assembly designed as described above. In the motor vehicle drivetrain according to the invention, power can be transmitted particular efficiently owing to the avoidance of axial reluctance forces.

Further advantages and features of the invention will emerge from the following description and from the following drawings, to which reference is made.

DETAILED DESCRIPTION OF THE DRAWINGS

Figure 1:
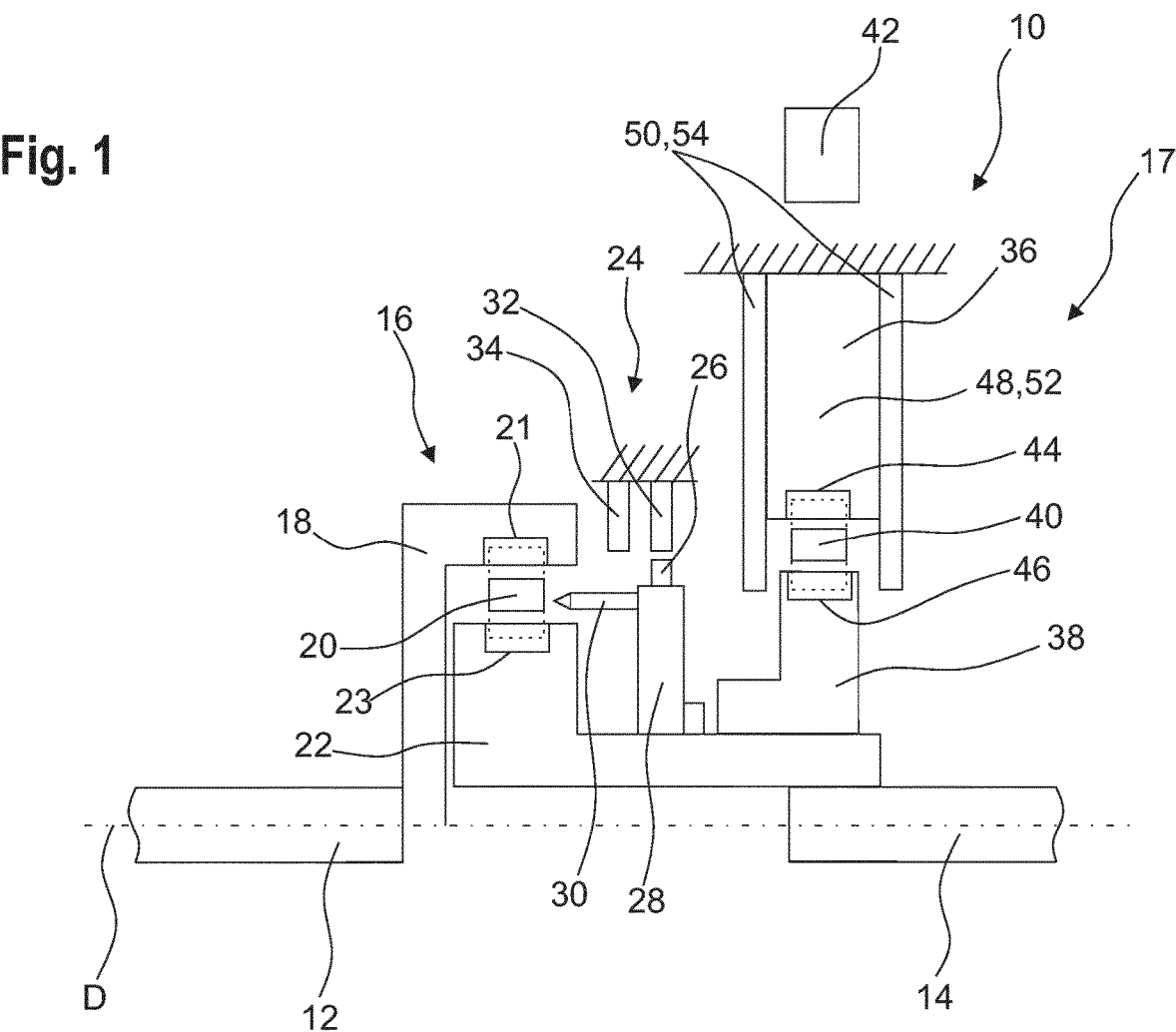
FIG. 1 schematically shows a clutch assembly according to an embodiment of the invention.

FIG. 1 schematically shows a clutch assembly 10 for a motor vehicle drivetrain for rotationally conjointly coupling two coupling elements 12, 14 according to an embodiment of the invention. For the sake of better clarity, the figures illustrate in each case only an upper half of the clutch assembly 10.

The coupling elements 12, 14 are shafts which are each rotatable about an axis of rotation D.

The clutch assembly 10 comprises a brake unit 17 which is suitable for braking or stopping the clutch assembly 10. In particular, the brake unit 17 can block a rotation of at least one of the coupling elements 12, 14.

Furthermore, the clutch assembly 10 comprises a clutch unit 16 which, for the purposes of rotationally conjointly coupling the coupling elements 12, 14, can be brought into a coupling state. For example, power can be transmitted from a motor to a transmission of a motor vehicle drivetrain when the clutch unit 16 is in a coupling state.

The clutch unit 16 has a clutch disk 18 and multiple pawls 20 which are arranged in a radial direction between the clutch disk 18 and a carrier element 22 of the clutch assembly 10.

The clutch disk 18 is connected rotationally conjointly to the coupling element 12, for example by means of a screw connection.

In order to bring the clutch unit 16 into a coupling state, the pawls 20 can be set upright and thus brought into engagement with a detent geometry 21, 23 of the clutch disk 18 and of the carrier element 22. The carrier element 22 thus forms a pawl counterpart element.

FIG. 1 illustrates the clutch unit 16 in a decoupled state in which the pawls 20 are not in engagement with the clutch disk 18 and with the carrier element 22.

An actuating mechanism 24 is provided for transferring the clutch unit 16 into a coupling state, in particular for setting the pawls 20 upright.

The actuating mechanism 24 comprises a permanent magnet 26 which is arranged between the clutch unit 16 and the brake unit 17 and which, for the purposes of transferring the clutch unit 16 into a coupling state in which the coupling elements 12, 14 are coupled rotationally conjointly to one another, can be moved from a first position, in which the coupling elements 12, 14 are decoupled, into a second position, in which the coupling elements 12, 14 are coupled.

The permanent magnet 26 is fastened to a carriage 28 which is mounted so as to be displaceable in an axial direction, wherein an actuating plunger 30 is fastened to the carriage 28. In particular, the actuating plunger 30 is arranged on a side of the carriage 28 directed toward the clutch unit 16, and extends in a direction toward the clutch unit 16.

In the exemplary embodiment shown, the carriage 28 is mounted displaceably on the carrier element 22.

In order to move the permanent magnet 26 and the carriage 28 that is connected thereto, a first electrically energizable coil 32 and a second electrically energizable coil 34 are provided, which, for the purposes of moving the permanent magnet 26 from the first position into the second position or vice versa, are correspondingly electrically energizable such that the coil 32, 34 through which electrical current is respectively flowing attracts the permanent magnet 26.

In the case of the arrangement shown in FIG. 1, the first coil 32 has been most recently electrically energized, and the clutch unit 16 is in a decoupled state.

When the permanent magnet 26 is in an end position, electrical energization of the coils 32, 34 is no longer necessary in order to hold the permanent magnet 26 in the respective position. This is because the permanent magnet 26 itself generates a magnetic flux around the coils 32, 34, which in turn leads to an axial reluctance force and thus gives rise to a detent action both in the coupling state and in the decoupled state of the clutch assembly 10.

If, proceeding from the situation shown, the second coil 34 is electrically energized, the permanent magnet 26 is attracted by the second coil 34, such that the permanent magnet 26 together with the carriage 28 is pulled toward the clutch unit 16. During this movement, the pawls 20 are set upright by the actuating plunger 30, and the clutch unit 16 is brought into a coupling state. A state in which the pawls 20 have been set upright is illustrated in FIG. 1 by means of a dashed line.

In the coupling state, the clutch disk 18 is coupled rotationally conjointly to the carrier element 22 by means of the pawls 20.

The carrier element 22 is in turn coupled rotationally conjointly in a suitable manner, for example by means of a toothing or a screw connection which is not illustrated, to the coupling element 14. Here, the carrier element 22 need not be connected directly to the coupling element 14; it is also possible for a further connecting element to be provided between the carrier element 22 and the coupling element 14.

When the pawls 20 are in detent engagement with the clutch disk 18 and with the carrier element 22, the two coupling elements 12, 14 are coupled rotationally conjointly to one another by means of the clutch unit 16.

The brake unit 17 comprises a holding plate 36, which is arranged rotationally fixedly on a housing (not illustrated) of the clutch assembly 10, and a brake disk 38. The brake disk 38 is, in an operating state of the clutch assembly 10, mounted so as to be rotatable relative to the holding plate 36.

In the exemplary embodiment shown, the brake disk 38 is coupled rotationally conjointly to the carrier element 22 and is mounted, so as to be displaceable in an axial direction to a limited extent, on the carrier element 22.

When the brake unit 17 is triggered, a movement of the brake disk 38 is braked or blocked. In this case, at least a rotation of the coupling element 14 is braked or blocked.

In order to trigger the brake unit 17, at least one further pawl 40 and a solenoid 42 are provided. The pawl 40 is brought into engagement with detent geometries 44, 46 of the holding plate 36 and of the brake disk 38 by means of an activation of the solenoid 42. The pawl 40 which has been set upright is shown by means of dashed lines in FIG. 1 for the purposes of a better illustration.

In order to avoid the generation of reluctance forces in the brake unit 17, the holding plate 36 is composed at least partially of a ferromagnetic material 48 and at least partially of a non-ferromagnetic material 50, such that a magnetic flux generated by the permanent magnet 26 in the surrounding components 36, 38 is interrupted. This prevents the brake disk 38 from being pulled in the direction of the permanent magnet 26 into axial contact with the holding plate 36. This would lead to undesired frictional moments during operation.

In the exemplary embodiment illustrated, the holding plate 36 comprises a ferromagnetic core 52 and two shield plates 54 composed of a non-ferromagnetic material, which are arranged in each case laterally on the holding plate 36, in particular to both sides of the ferromagnetic core 52. The shield plates 54 may be riveted, screwed or connected in some other suitable way to the ferromagnetic core 52. In alternative embodiment, it is possible for only one shield plate 54 to be provided, which is arranged preferably at a side of the holding plate 36 which is directed toward the permanent magnet 26. The shield plates 54 have in this case the same effect as air on the course of the magnetic flux.

The shield plates 54 extend inward in a radial direction beyond the ferromagnetic core 52, such that the shield plates 54 define an axial stop for the brake disk 38. As a result, the holding plate 36 at least partially radially overlaps the brake disk 38. In particular, the shield plates 54 serve for securing the surrounding components in position.

Figure 2:
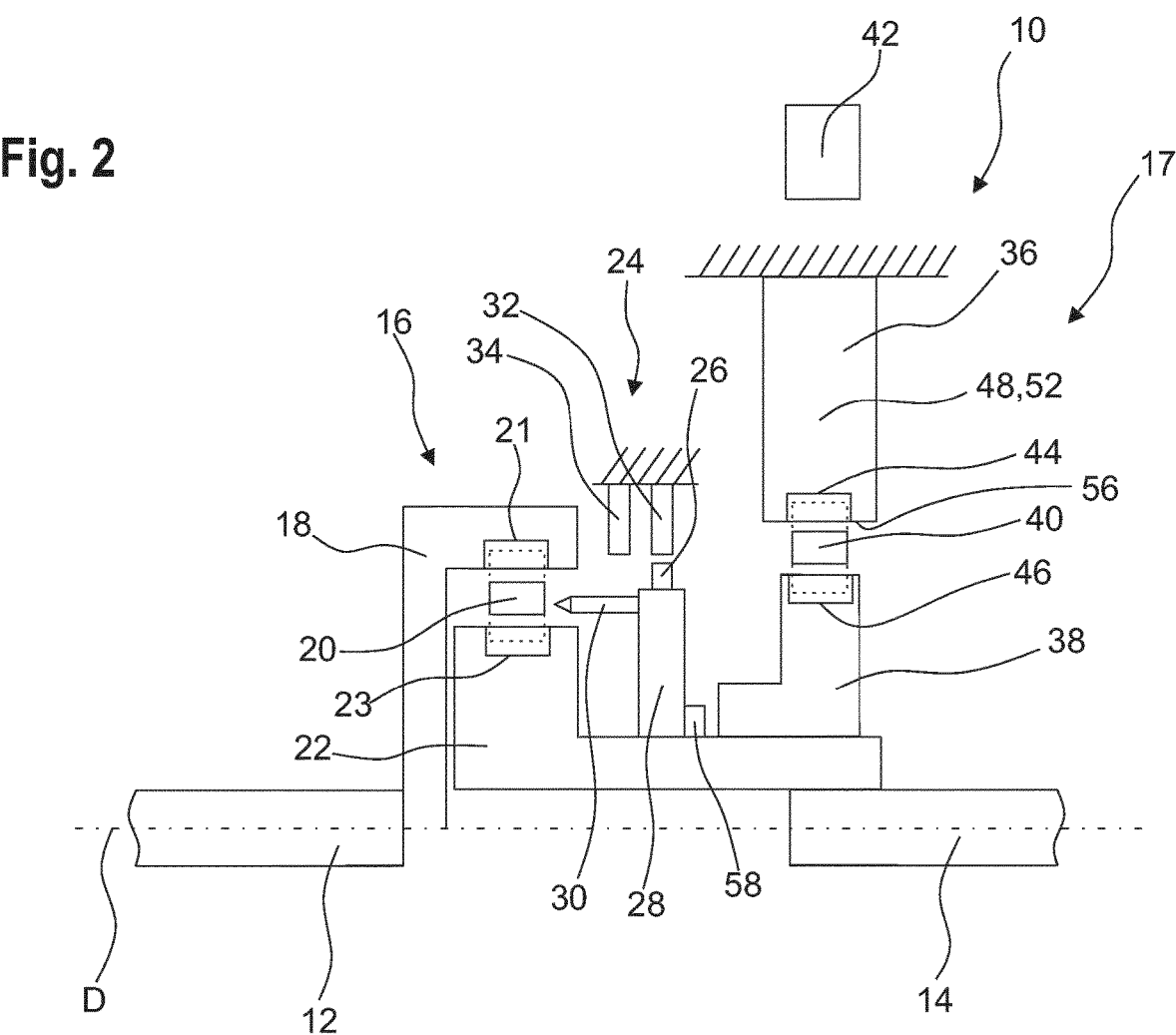
FIG. 2 shows a clutch assembly according to a further embodiment of the invention.

FIG. 2 shows a further embodiment of a clutch assembly 10 according to the invention.

The embodiment illustrated in FIG. 2 differs from the clutch unit 16 illustrated in FIG. 1 by the form of the holding plate 36.

In particular, the holding plate 36 is composed entirely of a ferromagnetic material 48. Furthermore, the holding plate 36 is of step-free form at its inner side 56 situated radially at the inside, such that no axial stop for the brake disk 38 is formed on the holding plate 36. In the exemplary embodiment shown, the holding plate 36 has a rectangular profile, whereby the holding plate 36 can be produced particularly easily.

If, during the operation of the clutch assembly 10, the brake disk 38 is pulled in the direction of the permanent magnet 26 owing to reluctance forces, it is consequently not possible for any undesired frictional moments to be generated between the holding plate 36 and the brake disk 38.

In this case, an axial movement of the brake disk 38 at least in a direction toward the clutch unit 16 is limited by a stop element 58. The stop element 58 simultaneously serves as an axial stop for the carriage 28.

Figure 3:
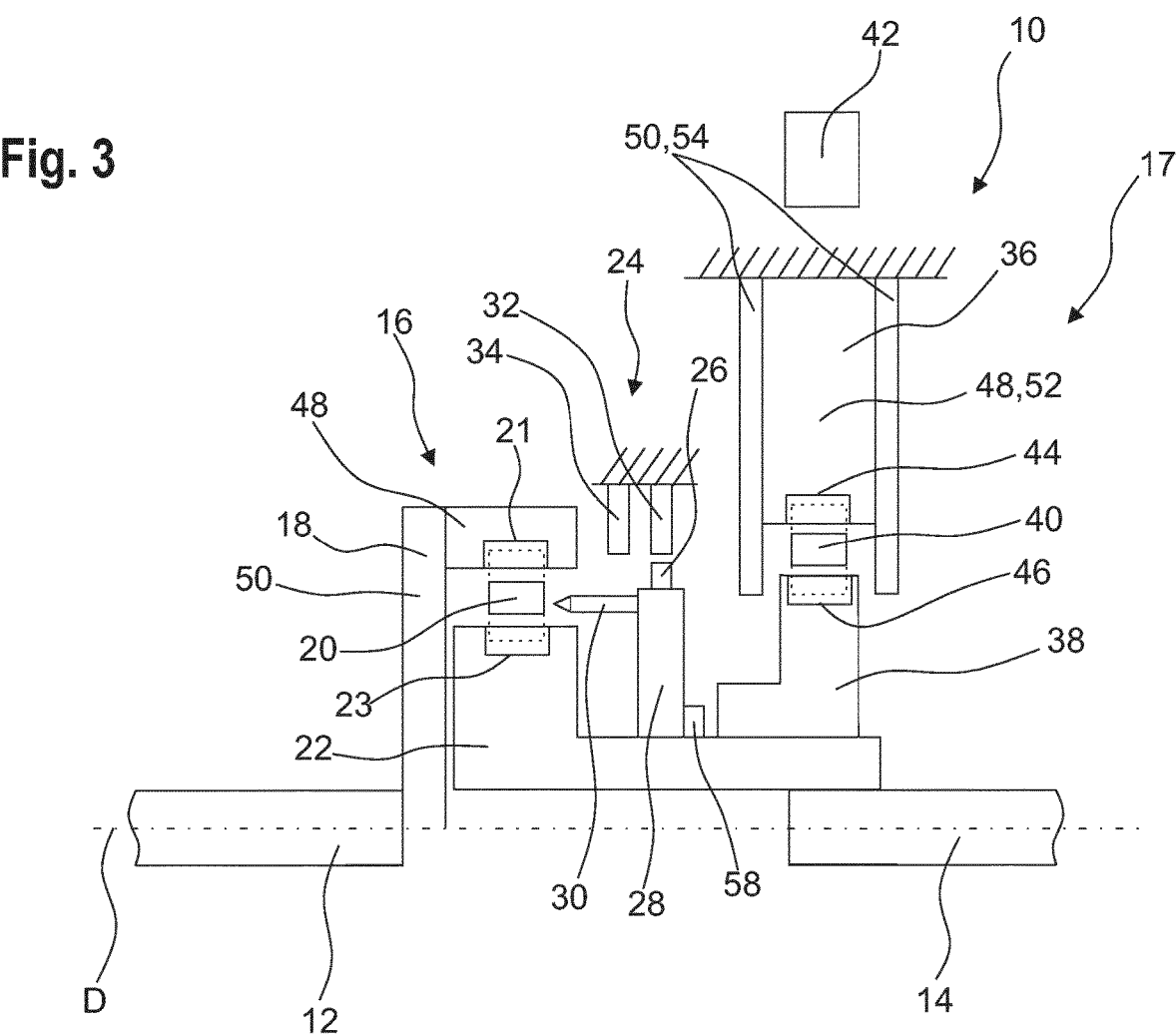
FIG. 3 shows a clutch assembly according to a further embodiment of the invention.

FIG. 3 shows a further embodiment of the clutch assembly 10 according to the invention.

The embodiment illustrated in FIG. 3 differs from the clutch unit 16 illustrated in FIG. 1 by the form of the clutch disk 18.

In the exemplary embodiment shown, the clutch disk 18 is of two-part form and comprises a ferromagnetic material 48 and a non-ferromagnetic material 50. In this way, it is also the case that reluctance forces are avoided in the clutch unit 16, such that high frictional moments between the clutch disk 18 and the carrier element 22 are avoided when the clutch unit 16 is not in a coupling state.

The separation between the ferromagnetic part and the non-ferromagnetic part of the clutch disk 18 extends in a radial direction in the exemplary embodiment shown, though may also run axially or conically. It is advantageous for that part of the clutch disk 18 which comprises the detent geometries 21 to be manufactured from the ferromagnetic material 48, because, in this way, higher torques can be transmitted without excessive wear occurring.

In a further embodiment according to the invention, which for the sake of simplicity is not illustrated, the clutch assembly 10 may have the brake unit 17 illustrated in FIG. 2 and the clutch unit 16 shown in FIG. 3.

Figure 4:
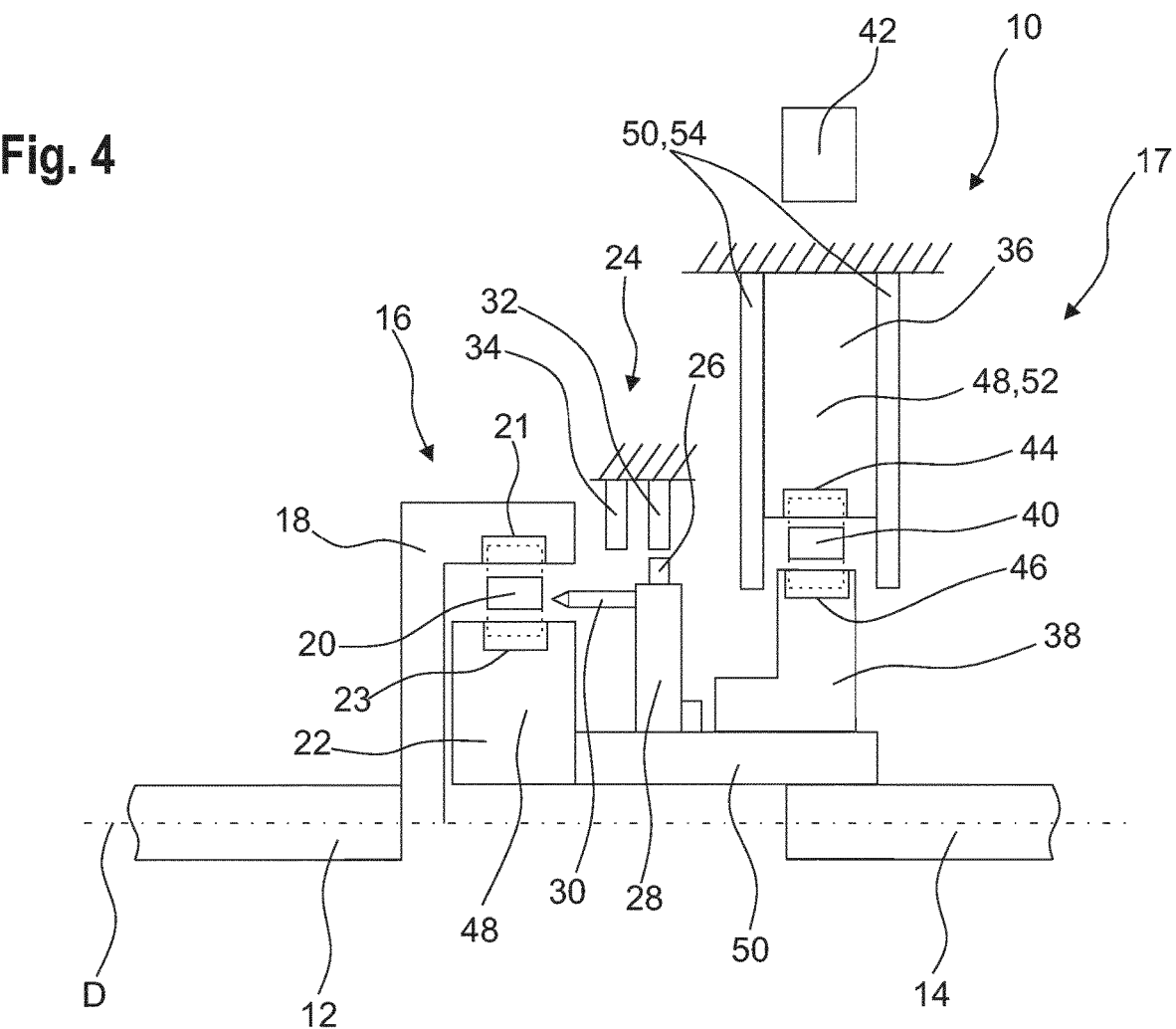
FIG. 4 shows a clutch assembly according to a further embodiment of the invention.

FIG. 4 shows a further embodiment of a clutch assembly 10 according to the invention.

The embodiment illustrated in FIG. 4 differs from the clutch unit 16 illustrated in FIG. 1 by the form of the carrier element 22.

In the exemplary embodiment shown, the carrier element 22 is of two-part form and comprises a ferromagnetic material 48 and a non-ferromagnetic material 50. In this way, it is likewise the case that reluctance forces are avoided in the clutch unit 16, such that high frictional moments between the clutch disk 18 and the carrier element 22 are avoided when the clutch unit 16 is not in a coupling state.

The separation between the ferromagnetic part and the non-ferromagnetic part of the carrier component 22 extends in a radial direction in the exemplary embodiment shown, though may also run axially or conically. It is advantageous for that part of the carrier component 22 which comprises the detent geometries 23 to be manufactured from the ferromagnetic material 48, because, in this way, higher torques can be transmitted without excessive wear occurring.

The carrier component 22 illustrated in FIG. 4 may also be combined with the embodiments illustrated in FIGS. 1 to 3.

Figure 5:
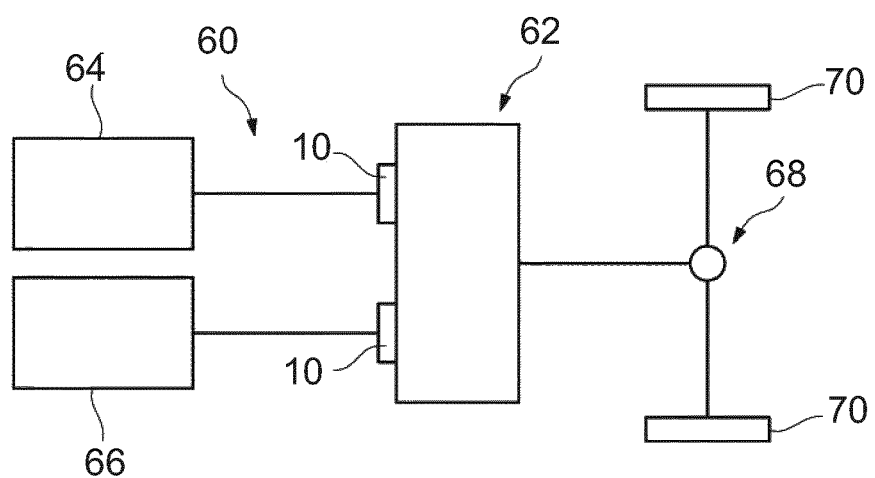
FIG. 5 shows a motor vehicle drivetrain with two clutch assemblies according to an embodiment of the invention.

FIG. 5 shows a motor vehicle drivetrain 60 according to the invention, in which two clutch assemblies 10 are provided.

Both clutch assemblies 10 operate in a summing transmission assembly 62, by means of which a first electric drive motor 64 and/or a second electric drive motor 66 are or is couplable to a torque output 68 of the motor vehicle drivetrain 60 for transmission of torque.

In the embodiment illustrated, two wheels 70 of the motor vehicle which has the motor vehicle drivetrain 60 are coupled to the torque output 68 for transmission of torque.

It is thus possible for the wheels 70 to be driven either by means of the first electric drive motor 64 or by means of the second electric drive motor 66. It is likewise possible for the wheels 70 to be driven by means of both electric drive motors 64, 66 simultaneously.

Here, it is always that one of the electric drive motors 64, 66 which is coupled in terms of drive to the summing transmission assembly 62 by means of the associated clutch assembly 10 is used for driving the wheels 70. That one of the electric drive motors 64, 66 which is not used for driving the wheels 70 is decoupled in terms of drive from the summing transmission assembly 62 by means of the respectively associated clutch assembly 10.

In the exemplary embodiment illustrated, both clutch assemblies 10 are of identical construction.

The motor vehicle drivetrain 60 discussed above is of purely electric configuration. It is self-evidently also conceivable for one of the electric drive motors 64, 66 to be replaced with an internal combustion engine. The motor vehicle drivetrain 60 is then a hybrid.

What is claimed is:

1. A clutch assembly for a motor vehicle drivetrain for rotationally conjointly coupling coupling elements, comprising:
   a clutch unit;
   a brake unit;
   at least one permanent magnet arranged between the clutch unit and the brake unit;
   a holding plate assigned to the brake unit;
   a brake disk assigned to the brake unit; and
   a first and a second electrically energizable coils, wherein
   the at least one permanent magnet is configured to shift the clutch unit into a coupling state in which the coupling elements are rotationally conjointly coupled to one another, the at least one permanent magnet being movable from a first position in which the coupling elements are decoupled into a second position in which the coupling elements are coupled by the clutch unit,
   the first and second electrically energizable coils are configured to move the permanent magnet from the first position into the second position or from the second position into the first position,
   the brake disk is rotatable relative to the holding plate and is configured to block transfer of torque input into the clutch assembly from being output from the clutch assembly,
   the holding plate is composed at least partially of a ferromagnetic material and at least partially of a non-ferromagnetic material, such that a magnetic flux generated by the permanent magnet in the brake unit is interrupted, and
   the holding plate is arranged radially outward from the brake disk relative to a rotation axis of the brake disk.

2. The clutch assembly according to claim 1, wherein the holding plate is rotationally fixed, and
   at least one pawl configured to be brought into engagement with corresponding detent geometries of the holding plate and of the brake disk such that at least one of the coupling elements is braked.

3. The clutch assembly according to claim 2, wherein the holding plate includes at least two shield plates arranged in each case laterally on the holding plate.

4. The clutch assembly according to claim 3, wherein at least one shield plate of the at least two shield plates is configured to provide an axial stop for the brake disk.

5. The clutch assembly according to claim 4, wherein the holding plate at least partially overlaps the brake disk in a radial direction.

6. The clutch assembly according to claim 2, further comprising:
   a solenoid configured to move the pawl into detent engagement with the holding plate and the brake disk.

7. The clutch assembly according to claim 6, wherein the clutch unit includes a clutch disk is composed at least partially of a ferromagnetic material and at least partially of a non-ferromagnetic material, such that a magnetic flux generated by the permanent magnet in the brake unit is interrupted.

8. The clutch assembly according to claim 7, wherein the clutch disk is composed entirely of non-ferromagnetic material.

9. The clutch assembly according to claim 7, wherein the clutch unit includes a carrier element, and
   the clutch disk is arranged axially adjacent to the carrier element and at least partially overlaps the carrier element.

10. The clutch assembly according to claim 9, wherein the clutch unit includes at least one further pawl configured to be brought into engagement with corresponding detent geometries of the clutch disk and the carrier element such that at least two of the coupling elements are rotationally coupled.

11. The clutch assembly according to claim 10, wherein the carrier element is composed at least partially of a ferromagnetic material and at least partially of a non-ferromagnetic material.

12. A clutch assembly for a motor vehicle drivetrain for rotationally conjointly coupling coupling elements along a rotation axis, comprising:
- a clutch unit;
- a brake unit;
- at least one permanent magnet arranged between the clutch unit and the brake unit;
- a holding plate assigned to the brake unit;
- a brake disk assigned to the brake unit; and
- a first and a second electrically energizable coils, wherein
  - at least one permanent magnet is configured to shift the clutch unit into a coupling state in which the coupling elements are rotationally conjointly coupled to one another, the at least one permanent magnet being movable from a first position in which the coupling elements are decoupled into a second position in which the coupling elements are coupled by the clutch unit,
  - the first and second electrically energizable coils are configured to move the permanent magnet from the first position into the second position or from the second position into the first position,
  - the brake disk is rotatable relative to the holding plate and is configured to block transfer of torque input into the clutch assembly from being output from the clutch assembly,
  - the holding plate is arranged radially outward from the brake disk relative to a rotation axis of the brake disk, and
  - the holding plate has a step-free form at an inner radius of the holding plate.

13. The clutch assembly according to claim 12, wherein the holding plate is rotationally fixed, and
at least one pawl configured to be brought into engagement with corresponding detent geometries of the holding plate and of the brake disk such that at least one of the coupling elements is braked.

14. The clutch assembly according to claim 13, wherein the holding plate at least partially overlaps the brake disk in a radial direction.

15. The clutch assembly according to claim 13, further comprising:
a solenoid configured to move the pawl into detent engagement with the holding plate and the brake disk.

16. The clutch assembly according to claim 15, wherein the clutch unit includes a clutch disk is composed at least partially of a ferromagnetic material and at least partially of a non-ferromagnetic material, such that a magnetic flux generated by the permanent magnet in the brake unit is interrupted.

17. The clutch assembly according to claim 16, wherein the clutch disk is composed entirely of non-ferromagnetic material.

18. The clutch assembly according to claim 16, wherein the clutch unit includes a carrier element, and
the clutch disk is arranged axially adjacent to the carrier element and at least partially overlaps the carrier element.

19. The clutch assembly according to claim 18, wherein the clutch unit includes at least one further pawl configured to be brought into engagement with corresponding detent geometries of the clutch disk and the carrier element such that at least two of the coupling elements are rotationally coupled.

20. The clutch assembly according to claim 19, wherein the carrier element is composed at least partially of a ferromagnetic material and at least partially of a non-ferromagnetic material.

21. A motor vehicle drivetrain, comprising:
at least one clutch assembly;
torque output; and
a plurality of wheels,
wherein
  the at least one clutch assembly is arranged to couple together coupling elements between at least one torque source and the torque output such that torque is transferable from the at least one torque source via the torque output to at least one of the plurality of wheels,
  the at least one clutch assembly includes
    a clutch unit;
    a brake unit;
    at least one permanent magnet arranged between the clutch unit and the brake unit;
    a holding plate assigned to the brake unit;
    a brake disk assigned to the brake unit; and
    a first and a second electrically energizable coils,
  the at least one permanent magnet is configured to shift the clutch unit into a coupling state in which the coupling elements are rotationally conjointly coupled to one another, the at least one permanent magnet being movable from a first position in which the coupling elements are decoupled into a second position in which the coupling elements are coupled by the clutch unit,
  the brake disk is rotatable relative to the holding plate and is configured to block transfer of torque input into the clutch assembly from being output from the clutch assembly,
  the holding plate is arranged radially outward from the brake disk relative to a rotation axis of the brake disk, and
  the first and second electrically energizable coils are configured to move the permanent magnet from the first position into the second position or from the second position into the first position.

* * * * *